Nov. 3, 1964 F. W. R. FARROW 3,155,863
ELECTRODE SUPPORT ROD AND SUPPORT PLATE THEREFOR
Filed Nov. 17, 1961 2 Sheets-Sheet 2

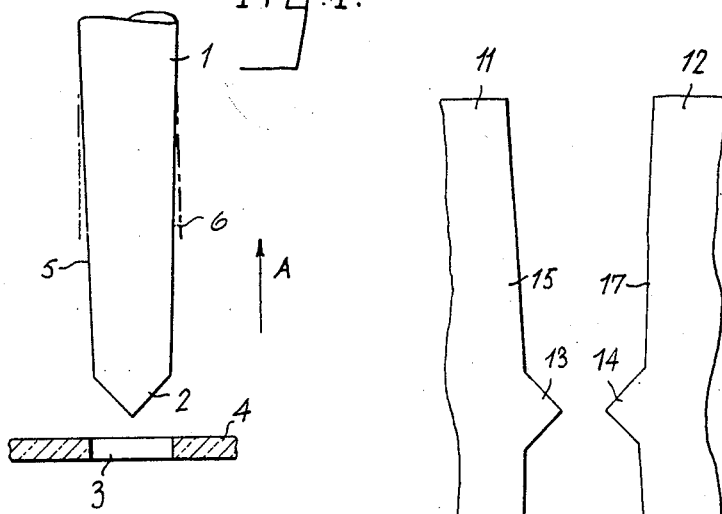
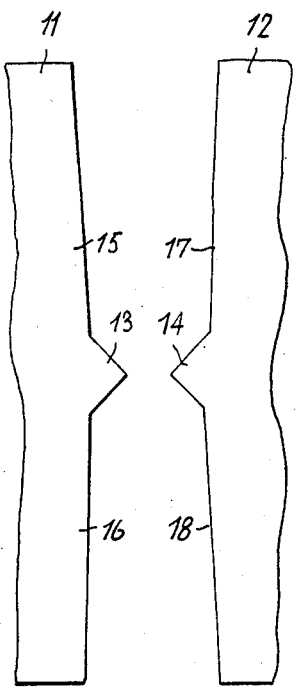
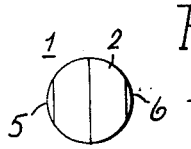
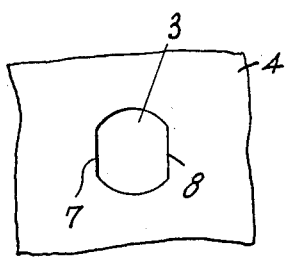

United States Patent Office 3,155,863
Patented Nov. 3, 1964

3,155,863
ELECTRODE SUPPORT ROD AND SUPPORT
PLATE THEREFOR
Frederic William Rodbard Farrow, Enfield, England,
assignor to Associated Electrical Industries Limited,
London, England, a British company
Filed Nov. 17, 1961, Ser. No. 153,096
Claims priority, application Great Britain Dec. 7, 1960
8 Claims. (Cl. 313—260)

This invention relates to the construction of thermionic valves. It is concerned with the fitting of an electrode structure to a mica end disc which supports the electrode structure in the valve envelope.

Such electrode structures usually have side support rods which terminate in legs extending a short distance beyond the electrode and which are inserted into holes in the end discs. It is necessary that the legs shall be readily inserted into the holes when the parts of a valve electrode structure are being assembled and that the legs thereafter fit in the end disc as tightly as possible to prevent microphony. These mutually conflicting requirements are difficult to achieve with practical manufacturing tolerances in the diameter of the support rods and in the size of the holes in the mica end disc.

An object of the invention is the provision of an improved valve construction in which the leg of a support rod the diameter of which falls within a range of manufacturing tolerances can readily be inserted in a hole in the end disc and yet provide a tight fit.

According to one aspect of the invention an internal electrode for a thermionic valve includes a support rod having an endwise-tapering, wedge-shaped end part.

According to another aspect of the invention, a mica support disc or plate for an internal electrode of a thermionic valve is preformed with a hole which is generally circular but includes two diametrically opposite flat sides. According to yet another aspect of the invention, a method of fitting an internal electrode of a thermionic valve which includes a support rod having a part of circular cross-section to a mica support disc or plate, comprises forming the support rod with an endwise-tapering, wedge-shaped end part, forming the mica support disc or plate with a hole which is complementary to the wedge-shaped end part, fitting the end part within the hole and forcing the end part into the disc or plate until the part of circular cross-section enters the hole to effect a tight fit of the rod in the hole.

In order that the invention may be more fully understood, reference will now be made to the accompanying drawings, in which:

FIGURE 1 is a section of grid electrode support rod and mica support disc or plate;

FIGURE 2 is an end view of the support rod of FIGURE 1 in the direction of arrow A;

FIGURE 3 is a plan view of part of the end disc;

FIGURE 4 shows a pair of cutting blades for forming grid rods in accordance with the invention.

Figure 5:
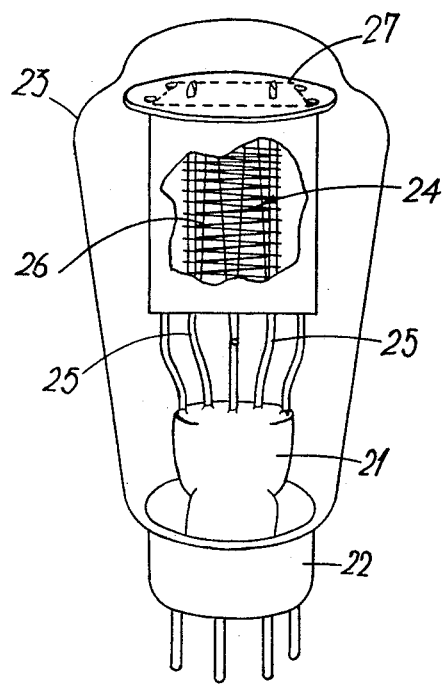
FIGURE 5 is a sectional side elevation, partly broken away, of a triode thermionic valve to which the invention is applied.

Referring now to FIGURE 1, there is shown therein part of a grid electrode support rod 1 which terminates in a chisel point 2 and is adapted for insertion in a hole 3 in a mica end disc 4.

If hole 3 were circular and rod 1 were cylindrical then it would not be possible for rod 1 always to fit closely in hole 3 over a range of manufacturing tolerances unless one accepted the possibility of difficulty in inserting the rod into the hole. To satisfy the two conflicting requirements, two opposite sides of rod 1 are formed with flats 5 and 6 inclined at a small angle to each other so that this end of the support rod tapers gently towards chisel point 2. These flats will be more apparent from a consideration of FIGURE 2 which is a view of rod 1 in the direction of arrow A. Further, hole 3 is shaped as shown in FIGURE 3 and is provided with two flat surfaces 7 and 8 opposite each other and spaced apart by a distance slightly greater than the distance between flats 5 and 6 immediately beyond chisel point 2. In a typical numerical example, rod 1 has a diameter of 1.0 mm. and the distance between flats 5 and 6 reduces to 0.90 mm. and the total distance along the rod along which flats 5 and 6 extend is 3.5 mm., whereas the distance between surfaces 7 and 8 can be between 0.90 mm. and 0.925 mm. Thus the flats converge at an angle to the rod axis of about one degree.

It will be appreciated that rod 1 can be pushed slowly and easily into hole 3 and the mica flats 7 and 8 will gradually be forced outward until the cylindrical portion of the rod passes through the hole. An advantage of this arrangement is that the tolerance in the distance between edge 7 and edge 8 of the hole need not be as close as the tolerance in the diameter of the circular hole normally used for accepting a cylindrical rod.

FIGURE 4 shows a section through a pair of cutting blades 11 and 12 for cutting and forming ends of grid rods in accordance with the invention. Grids are normally wound round a pair of continuously fed parallel side fed rods and each of the rods is cut at intervals to provide individual grid electrodes. The cutting blades for performing this operation will therefore comprise the blades 11 and 12 as shown which have cutting surfaces 13 and 14 which sever the rods and impart a chisel point to the severed ends. Plate 11 also has two flat squeezing surfaces 15 and 16 and plate 12 has similar flat squeezing surfaces 17 and 18. These surfaces form the flats at the severed ends of the rods. On the forcing together of plates 11 and 12, surfaces 15 and 17 form the tapering flats 5 and 6 at the end of one grid support rod while surfaces 16 and 18 form corresponding flats at the end of the other grid support rod.

As will be seen from FIGURE 5, the completed valve includes a glass pinch 21 in which the lower ends of the support rods for the various electrodes are mounted, and a base 22 to which the pinch is secured and to which the evacuated glass envelope 23 is secured. One of the valve electrodes is the control grid 24 which consists of two parallel support rods 25 over an intermediate part of which is wound a fine wire 26 forming the actual control grid. The upper ends of the support rods 25 extend through and are positioned by the mica end disc 27. The present invention is particularly suited to the support rods of sucht a control grid.

What I claim is:

1. An internal electrode suitable for a thermionic valve, and mounted on a solid support rod consisting of:
    a part connected to the electrode;
    a sharply tapering lead-in part adapted to facilitate entry of the support rod end into a mica support disc; and
    a part adjacent the lead-in part, of circular cross section and formed with two diametrically opposite flattened faces which converge towards the lead-in part at an angle to the rod axis of about one degree.

2. The internal electrode according to claim 1, in which the lead-in part is flat-sided and terminates in a straight chisel edge.

3. The internal electrode according to claim 1, wherein is provided a mica support disc or plate for said internal electrode having a hole comprising two diametrically opposite arcs of a common circle and two straight parallel sides, whereby upon the insertion of said electrode support rod of appropriate size, free initial entry of the support rod is permitted but continued insertion of the support rod deforms the straight sides of the hole so that they fit tightly about the cylindrical part of the support rod which is a close clearance fit between the circular arcs.

4. A thermionic valve including:
   an envelope;
   an internal electrode;
   a solid support rod on which the internal electrode is mounted and consisting of a part connected to the electrode, a sharply tapering lead-in part adapted to facilitate entry of the support rod end into a mica support disc, and a part adjacent the lead-in part of a circular cross section and formed with two diametrically opposite flattened faces which converge towards the lead-in part at an angle to the rod axis of about one degree; and
   a mica support disc or plate provided with a hole comprising two diametrically opposite arcs of a common circle and two straight parallel sides, of such a size that, upon insertion of the support rod, free initial entry of the support rod is permitted but continued insertion of the support rod deforms the straight sides of the hole so that they fit tightly about the cylindrical part of the support rod which is a close clearance fit between the circular arcs.

5. The method of mounting an electrode within the envelope of a thermionic valve which includes the steps of providing an electrode with a cylindrical support rod, shaping the support rod into a sharply tapering lead-in part and a wedge-shaped part tapering in the direction of the end of the rod with two diametrically opposite flattened faces each inclined at an angle of the order of one degree of the axis of the rod,
   forming a mica support disc or plate with a hole of a shape which comprises two diametrically opposite arcs of a circle which will just accommodate the circular cross-section of the rod and two straight parallel sides whose distance apart is greater than the thickness of the end of the tapered part of the rod,
   fitting the end part of the rod within the hole and forcing the rod through the mica disc or plate until the cylindrical part of the rod enters the hole whereby the rod is located laterally by the circular arcs and is held tightly by the sides of the hole which have been deformed.

6. The method according to claim 5, in which the shaping of the end part of the support rod is accomplished by squeezing of this part of the rod by a tool having two flat surfaces set at the appropriate angle, which are moved towards one another with the rod between them until they are the appropriate distance apart to form the wedge-shape of the end part of the rod.

7. The method according to claim 6, in which the support rod is cut off the stock of rod in the same operation as the squeezing and by the same tool which includes a cutting edge.

8. The method according to claim 7, in which the adjacent end of the rod stock is shaped in a similar manner for another electrode in the same operation by the same tool which includes two further flat surfaces set at the appropriate angle and distance apart.

References Cited in the file of this patent
UNITED STATES PATENTS

| | | |
|---|---|---|
| 2,131,254 | Miller | Sept. 27, 1938 |
| 2,170,410 | Imboden | Aug. 22, 1939 |
| 2,286,996 | Dickinson | June 16, 1942 |